United States Patent [19]

Fletcher

[11] Patent Number: 4,869,628
[45] Date of Patent: Sep. 26, 1989

[54] TRUCK CARGO RACK

[76] Inventor: Harry J. Fletcher, 672 N. 15th St., San Jose, Calif. 95112

[21] Appl. No.: 916,637

[22] Filed: Oct. 8, 1986

[51] Int. Cl.⁴ .............................................. B61D 45/00
[52] U.S. Cl. .................................... 410/100; 410/129; 296/3
[58] Field of Search .................. 296/3, 4, 43; 410/31, 410/32, 34, 36, 42, 47, 68, 96, 97, 52, 37, 49, 50, 100, 129, 130, 143, 150, 153, 94; 224/42.12, 42.13; 211/71; 280/5 A, 5 D

[56] References Cited

U.S. PATENT DOCUMENTS

| 2,609,103 | 9/1952 | Gravos et al. | 211/71 |
| 2,618,509 | 11/1952 | Carlson | 296/3 |
| 2,729,196 | 1/1956 | Breitenbach | 296/3 |
| 3,428,358 | 2/1969 | Yeary | 296/43 |
| 3,677,562 | 7/1972 | Bronstein | 296/43 |
| 4,061,391 | 12/1977 | Violette | 410/36 |
| 4,278,376 | 7/1981 | Hunter | 410/130 |
| 4,312,620 | 1/1982 | Muschalek, Jr. | 224/42.12 |
| 4,405,170 | 9/1983 | Raya | 296/3 |
| 4,529,345 | 7/1985 | Van Gompel | 410/52 |

FOREIGN PATENT DOCUMENTS 559472 3/1957 Italy .................................... 410/42

Primary Examiner—Robert B. Reeves
Assistant Examiner—Joseph D. Pape
Attorney, Agent, or Firm—Rosenblum, Parish & Bacigalupi

[57] ABSTRACT

A truck cargo rack for holding cargo in the bed of a truck is connected to the bed of the truck and to the sidewalls of the truck. The rack includes adjustable frame members for securing loads of various sizes and a cargo restraining strap to securely hold the cargo to the frame members.

14 Claims, 7 Drawing Sheets

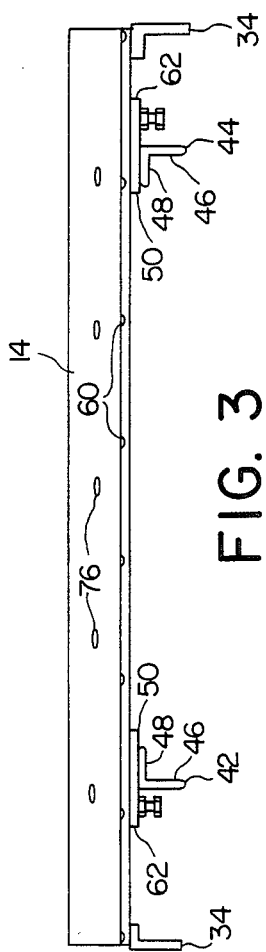
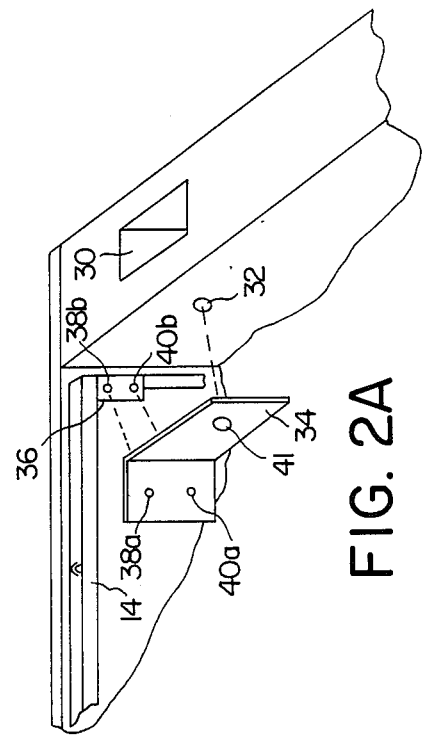

TRUCK CARGO RACK

BACKGROUND OF THE INVENTION

1. Field Of The Invention

The present invention relates to truck cargo racks that fit within the bed of a truck, and more particularly to truck cargo racks that are suitable for carrying drums of fluid.

2. Description Of The Prior Art

Truck racks have been designed for particular types of cargo such as lumber and glass panes and perhaps other types of cargo. A particular cargo, namely drums of liquids, such as fifty-five gallon drums of a flammable liquid such as paint thinner, require a rack to safely transport the cargo. A fifty-five gallon drum of fluid will weigh approximately four hundred and eighty five pounds and, in an emergency driving situation can fly about the truck bed and even be thrown from the truck, creating a serious potential for damage and injury. There is therefore a need for a strong, safe, easy to install truck cargo rack that is capable of securely holding cargo such as drums of liquid. There is a particular need to carry a fifty five gallon drum in a horizontal position to lower its center of gravity and thus more safely transport it.

SUMMARY OF THE INVENTION

It is an object of the present invention to provide a truck rack for securely fastening cargo such as one or more fifty-five gallon drums.

It is another object of the present invention to provide a truck rack which is easy to install in the bed of an existing truck.

It is a further object of the present invention to provide a truck rack which securely fastens the cargo against lateral, frontal and vertical movement.

It is yet another object of the present invention to provide a truck rack which is easy to use.

The truck rack of the present invention includes a substantially rectangular frame which is mounted in the forward portion of the truck bed. Two cargo support members are adjustably mounted within the frame to provide a lateral and frontal constraint on the movement of the cargo. One or more cargo straps having an adjustable attachment and tightening mechanism are utilized to wrap around the cargo and hold it securely to the rack. The cargo straps are attached to strap loops disposed at various locations on the rack.

It is an advantage of the present invention that a truck rack is provided for securely fastening cargo such as one or more fifty-five gallon drums.

It is another advantage of the present invention that a truck rack is provided which is easy to install in the bed of an existing truck.

It is a further advantage of the present invention that a truck rack is provided which securely fastens the cargo against lateral, frontal and vertical movement.

It is yet another advantage of the present invention that a truck rack is provided which is easy to use.

These and other objects and advantages of the present invention will be apparent from the following detailed description of the preferred embodiments which make reference to the several figures of the drawing.

IN THE DRAWINGS

FIG. 2A is a perspective view of an attachment mechanism of the instant invention to the side of the truck bed;

FIG. 3 is a top plan view of the truck rack depicted in FIG. 1;

DESCRIPTION OF THE PREFERRED EMBODIMENT

Figure 1:
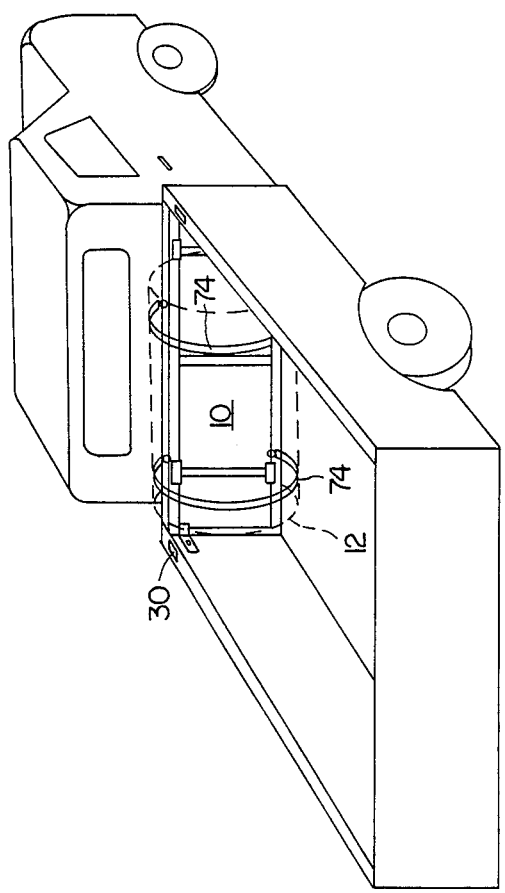
FIG. 1 is a perspective view of a first preferred embodiment of the truck rack of the present invention.

FIG. 1 depicts the truck rack 10 of the present invention in an installed position in the frontward portion of a truck bed. A fifty-five gallon drum 12, shown in phantom, is held in position by the rack.

Figure 2:
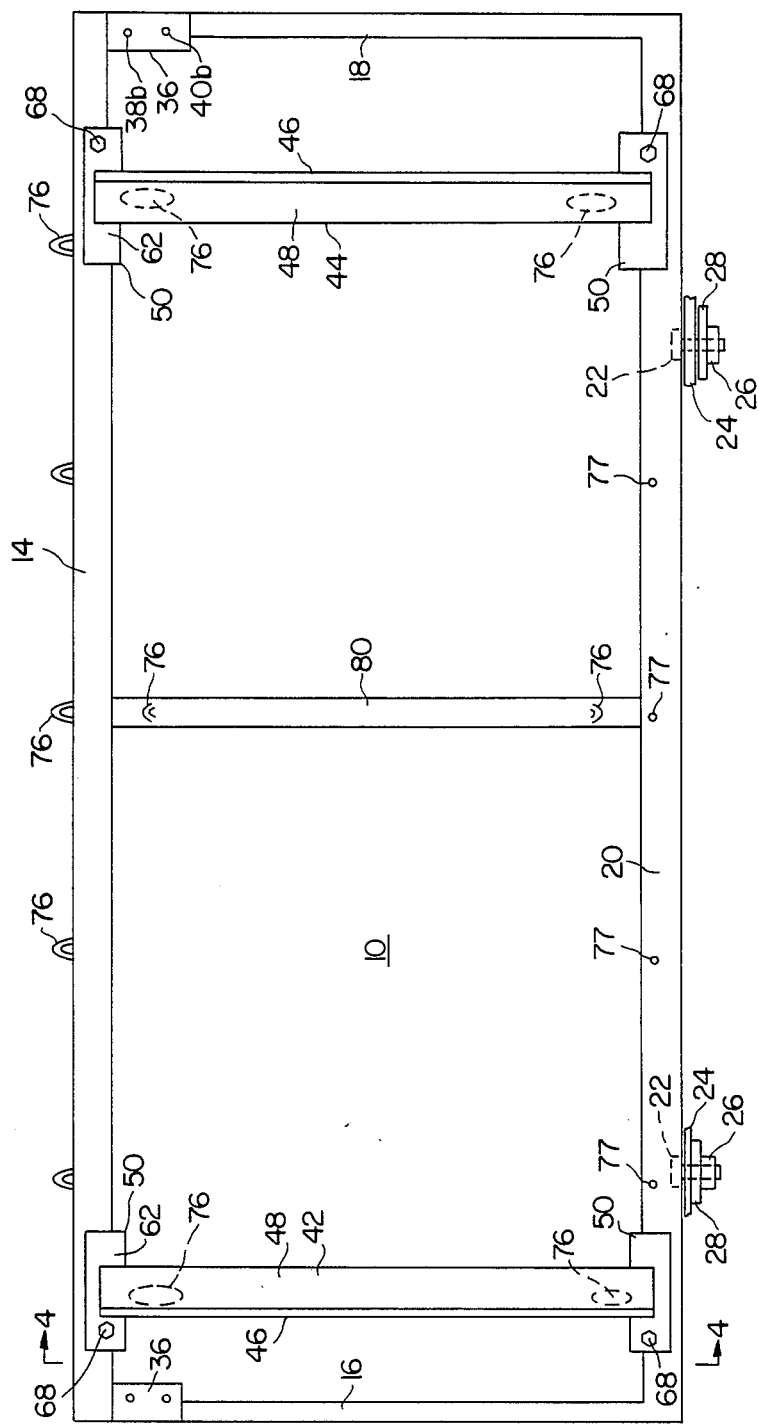
FIG. 2 is a front elevational view of the truck rack depicted in FIG. 1.

FIG. 2 depicts a front elevational view of a preferred embodiment of the rack 10. The rack 10 has a generally rectangular frame consisting of a top bar 14, left and right side bars 16 and 18 respectively, which are welded to the outer ends of the top member 14 and depend downwardly therefrom. The lower ends of the side bars 16 and 18 are welded to the outer ends of a bottom bar 20, thus establishing the basically rectangular frame of the rack 10.

The rack 10 is bolted into the truck bed at various points. In the preferred embodiment, two bed engagement bolts 22 protrude downwardly thru holes formed in the bottom bar 20, thru the truck bed 24, and are clamped by a nut 26. A plate 28, through which bolt 22 passes, is recommended to strengthen the holding power of the engagement with the truck bed. While two spaced apart bolts 22 are shown in the preferred embodiment it is obvious that one centrally located bolt or several such bolts, properly spaced, could be utilized. Additionally, other suitably strong clamping means can be utilized in place of the bolts 22 to join the bottom bar 20 to the truck bed 24.

The upper portions of the frame are also joined to the truck for support. Referring to FIGS. 1, 2 and 2A, for truck bodies containing stake holes 30 formed in the sides of the truck bed, the invention utilizes the stake holding holes 32 as an attachment point for the upper portions of the rack 10. Specifically, an L-shaped bracket 34 is bolted to a bracket plate 36 that is welded to the upper portions of the side bars 16 and 18 utilizing mating bolt holes 38a and 40a formed in the bracket 34 and holes 38b and 40b formed in the plate 36 respectively. A bolt hole 41 is formed thru the lateral portion of bracket 34 to mate with the stake holding hole 32, such that a nut and bolt can clamp the plate 34 to the side of the truck bed. For truck beds that do not contain stake holes 30, a hole corresponding to stake hole 32 is formed in the side of the truck bed to permit attachment. It is deemed obvious that other means of attachment of the upper ends of the side bars 16 and 18, or the top bar 14, to the truck bed can be employed, provided that a firm attachment is created.

Figure 4:
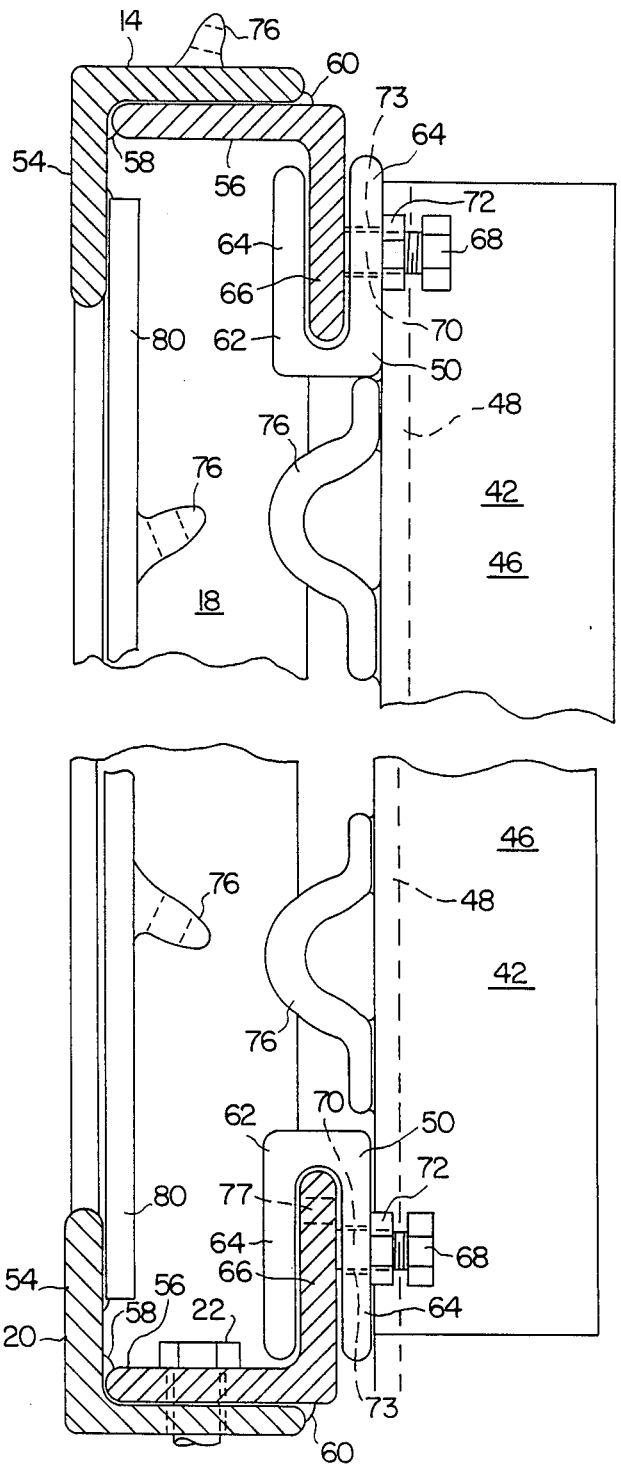
FIG. 4 is a side elevational view, taken along lines 4—4 of FIG. 2.

A left restraining bar 42 and a right restraining bar 44 are slideably engaged between the top bar 14 and the bottom bar 20. As depicted FIGS. 2, 3 and 4, each restraining bar 42 and 44 is preferably formed from angle iron having an L-shaped cross section and is disposed on the cargo holding side of the frame such that one leg 46 of the L-shaped bar restrains the cargo against lateral movement and the other leg 48 of the L-shaped bar restrains the cargo against forward movement. As is depicted in FIGS. 2, 3 and 4, each end of each support bar 42 and 44 is welded to a slideable clamp 50 which can firmly engage the top bar 14 or bottom bar 20 associated therewith. A detailed understanding of the clamp 50 is presented in FIG. 4, which is a side elevational view taken along lines 4—4 of FIG. 2.

As depicted in FIG. 4, the top bar 14 and the bottom bar 20 possess a generally U-shaped cross section with the two legs of the "U" of each bar disposed towards the two legs of the other bar. In the preferred embodiment, both the top bar 14 and the bottom bar 20 are formed from two L-shaped cross sectioned members 54 and 56 that are welded together with several interior welds 58 and exterior welds 60 formed at several locations along the length of the joinder of bar members 54 and 56. FIG. 3 depicts several exterior welds 60. It is obvious that the top bar 14 and/or bottom bar 20 could be made from single U-shaped cross sectioned members rather that the two welded L-shaped cross sectioned members 54 and 56. Each clamp 50 utilizes a relatively short U-shaped cross sectioned bracket 62 that is formed such that the distance between legs 64 of the U-shaped bracket 62 is sufficient to permit the legs 64 to slideably engage the interposed leg 66 of the top or bottom bar to which the clamp 50 is affixed. A clamp engagement bolt 68 is threadably engaged with the bracket 62 such that the shaft 70 of bolt 68 passes thru the outward leg 64 of the bracket 62 and makes contact with the interposed leg 66. In the preferred embodiment, a threaded nut 72 is welded to the bracket leg 64 and a non-threaded hole 73 is formed in the bracket leg 64. It is therefore to be understood that upon the tightening of the bolt 68, the interposed leg 66 will become tightly clamped within the bracket 62. It is also to be understood that other clamp mechanisms are within the contemplation of the invention.

Cargo, such as a fifty-five gallon drum, is held in the rack 10 utilizing cargo straps 74 such as those depicted in FIG. 1. In the preferred embodiment, each cargo strap posesses a metal hook 75 afixed on each end and an adjustable ratchet 79 for tightening the strap. Strap hook engagement loops 76 are disposed at various locations through-out the rack 10. As depicted in FIGS. 2, 3 and 4, a plurality strap engagement loops 76 are formed on the top bar 14 by welding loop elements 76 thereto. Additional strap engagement loops 76 are welded to the support bars 42 and 44 proximate the upper and lower ends thereof. It is to be understood that other rack hook engagement devices, such as holes 77 drilled thru the button bar and/or other frame elements at various locations could be utilized, and such devices are within the contemplation of the invention.

For added frame strength, the preferred embodiment includes a mid-brace 80. As depicted in FIGS. 2 and 4, the mid-brace 80 is welded at its top and bottom extremities to the mid-area of the top bar 14 and bottom bar 20. The brace 80 may also have strap engagement loops 76 disposed thereon. The mid-brace 80 can also be designed to be slideably engageable within the top bar 14 and bottom bar 20 by utilizing bracket clamps such as clamps 50 at the upper and lower end of mid-brace 80.

Figure 5:
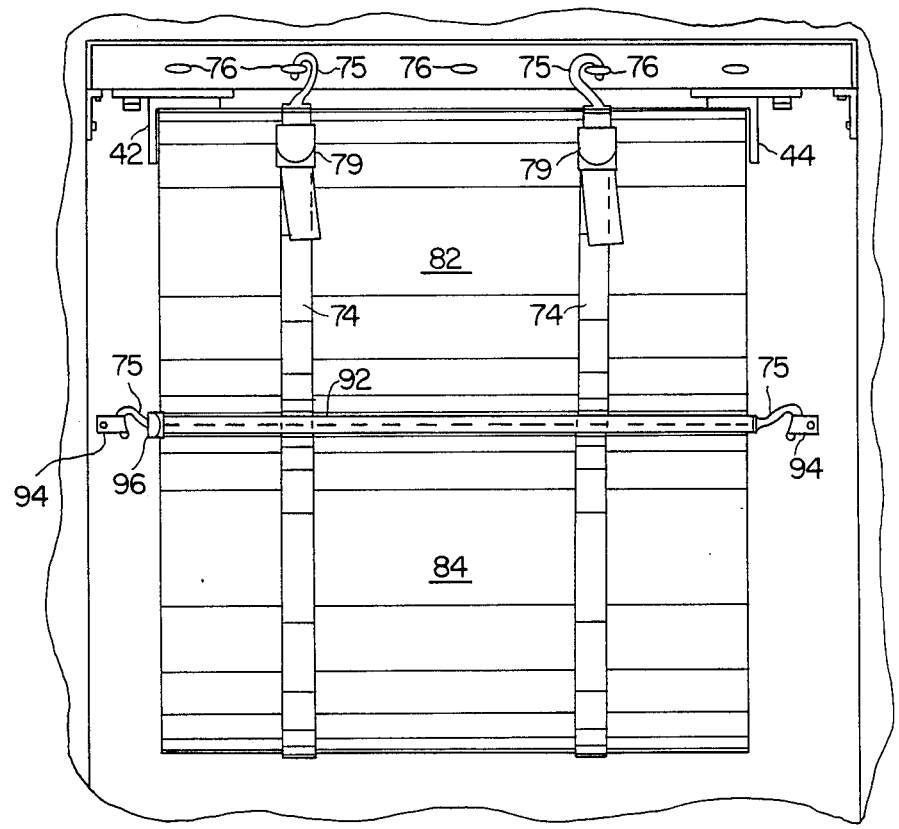
FIG. 5 is a top plan view of the present invention when utilized for carrying two fify-five gallon drums.
Figure 6:
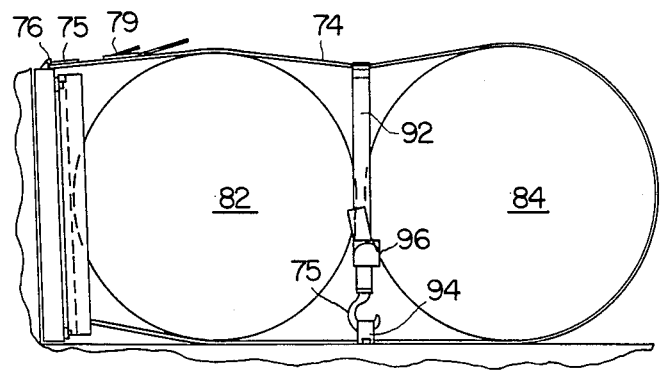
FIG. 6 is a side elevational view showing the utilization of the instant ivention when carrying two fifty-five gallon drums.
Figure 7:
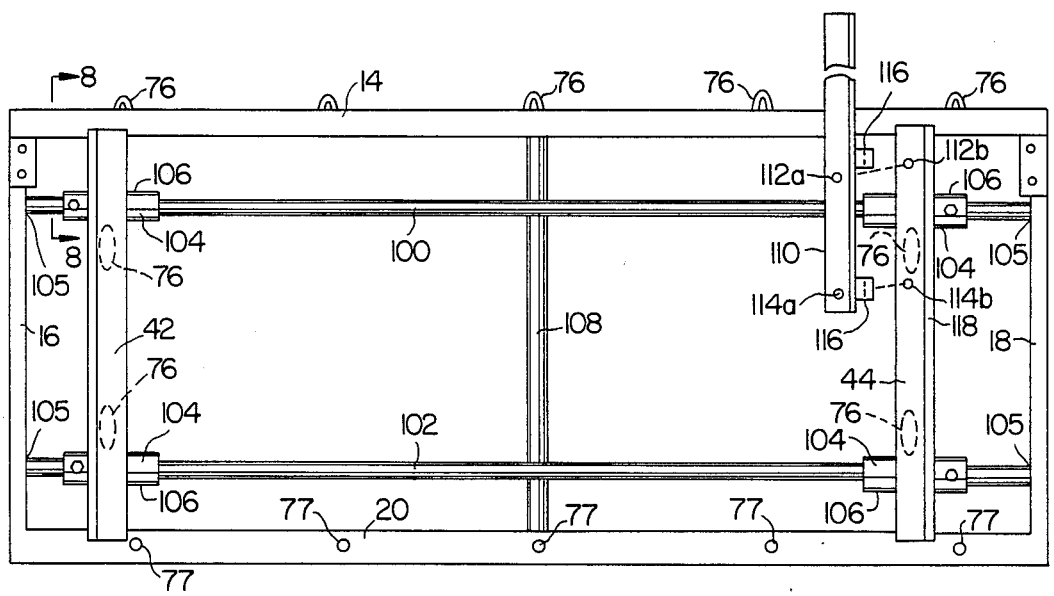
FIG. 7 is a front elevational view of another embodiment of the present invention.

FIGS. 5 and 6 depict the present invention when utilized to hold down two fifty-five gallon drums 82 and 84. As depicted in FIGS. 6 and 7, two cargo straps 74 surround the two drums in a frontward to rearward orientation. That is, each strap 74 is attached to an engagement loop, passes under both drums 82 and 84, passes behind drum 84 and over the top of both drums and then attaches to another engagement loop. The ratchet 79 is utilized to tighten the cargo strap after it has been passed around both drums as described hereinabove. To restrict vertical and lateral motion of the drum 84 a crossover strap 92 is utilized. The strap 92 is engaged to two floor anchors 94 utilizing strap hooks as previously discussed. A ratchet 96 is utilized to tighten the strap 92 after it is passed over the two previously tightened cargo straps 74. In the preferred embodiment, the floor anchors 94 include a nut and bolt combination which passes thru a hole formed in the truck bed in a manner similar to bolt 22 and nut 26. A strap hook engagement loop, such as may be fabricated from a loop of cargo strap material having grommets formed therethroygh for engagement with the floor anchor 94 is suitable. However, other types of bed engagement mechanisms could be utilized and are within the contemplation of the invention.

FIG. 7 is a front elevational view of an alternative embodiment of the present invention. The top bar 14, side bars 16 and 18 and bottom bar 20 are fabricated as has been previously discussed. In the embodiment of FIG. 7, the left restraining bar 42 and right restraining bar 44 are slideably engaged to an upper slide bar 100 and a lower slide bar 102 utilizing slideable engagement brackets 104. The lateral ends 105 of the upper bar 100 and lower bar 102 are welded to the side bars 16 and 18 for strength and support. A vertical reinforcement bar 108 is welded at its extremeties 107 to the upper bar 14 and lower bar 20 at the mid-section of the upper bar and lower bar. The reinforcement bar 108 may also be welded 109 to the upper bar 100 and lower bar 102 to provide further strength to those members at their mid-sections.

Figure 8:
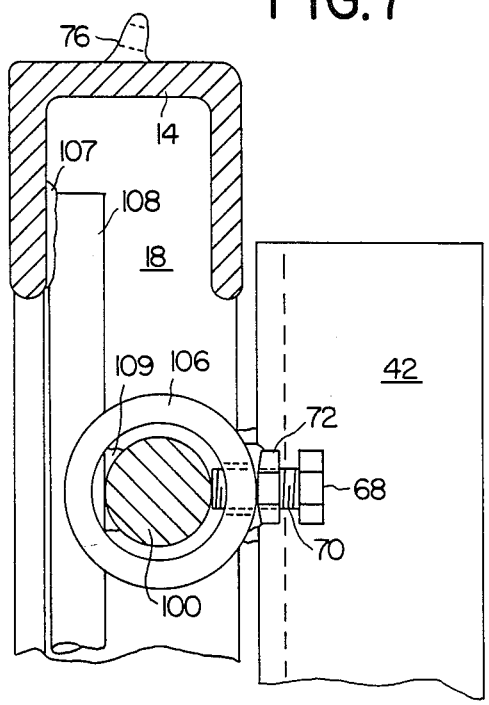
FIG. 8 is a side elevational view taken along lines 8—8 of FIG. 7.

As depicted in FIG. 8, the support bars 100 and 102 are formed of circular stock and the slideable clamp 104 utilizes a cylindrical sleeve 106 which slideably engages bar 100 therein. As previously discussed regarding clamp 50, a bolt 68 is threadably engaged in the clamp 104 to engage the bar 100. The preferred method of engagement of bolt 68 is by drilling a hole thru the sleeve 106 and welding a nut 72 to the outside of sleeve 106, such that the bolt 68 is threadably engaged in the nut 72 and the shaft 70 of bolt 68 passes thru the hole in the sleeve 106 to apply pressure against the bar 100. As indicated hereinabove, other means of slideable attachment of the restraining bars 42 and 44 are within the contemplation of the invention.

Figure 9:
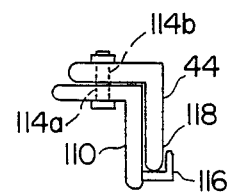
FIG. 9 is a top plan view of the extension bar engagement of the present invention.

An optional extension bar 110 for increasing the vertical length of the restraining bar 44 is depicted in FIGS. 7 and 9. The extension bar 110 has two bolt holes 112a and 114a therethrough that mate with two bolt holes 112b and 114b formed through the restraining bar 44. Two edge restraining tabs 116 are welded to the extension bar 110 and act to engage the lateral edge 118 of the restraining bar 44 upon engagement of the extension bar 110 with the restraining bar 44, as depicted in FIG. 9.

Figure 10:
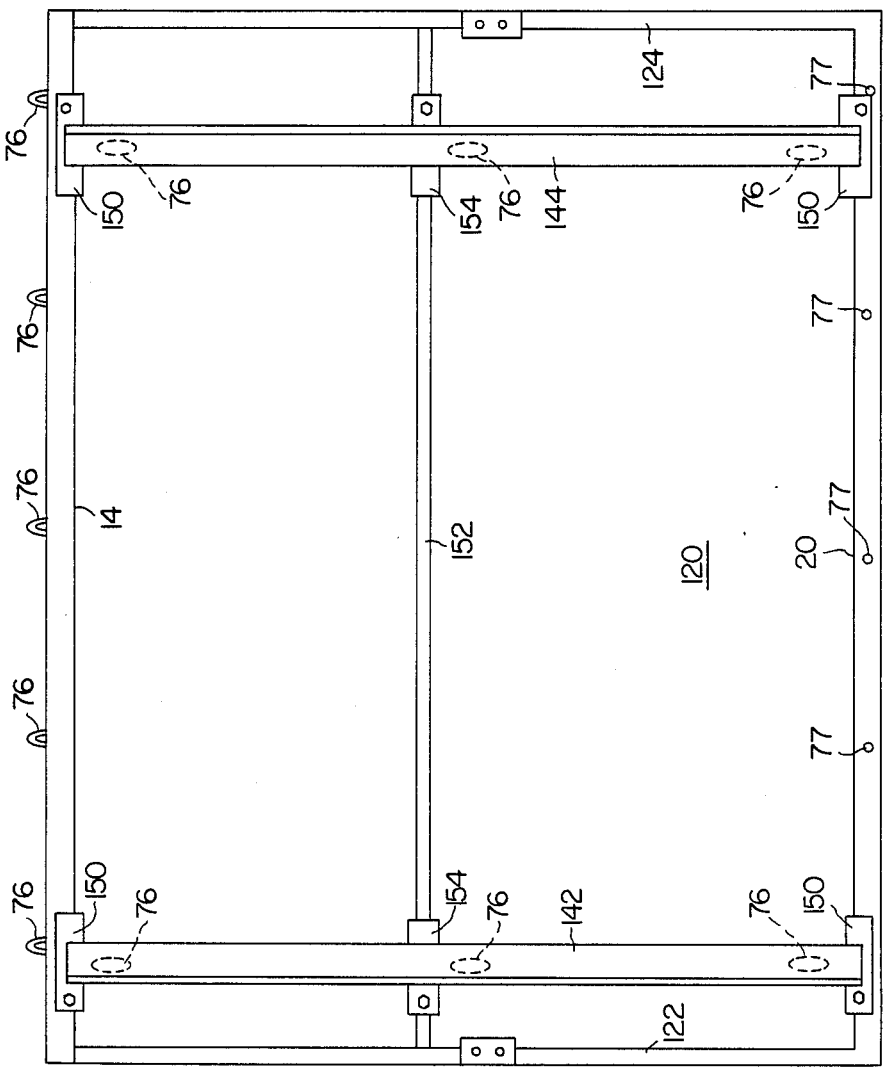
FIG. 10 is a front elevational view of another embodiment of the present invention.

FIG. 10 is a front elevational view of a further embodiment 120 of the present invention. The cargo rack 120 has a frame formed from a top bar 14, left side bar 122, right side bar 124 and bottom bar 20. The frame thus formed is similar to the frame of rack 10 described hereinabove, however, frame 120 is formed with longer side bars 122 and 124 for installation on trucks having a taller bed. Two cargo restraining bars 142 and 144 are slideably engaged between the top bar 14 and bottom bar 20. Each restraining bar 142 and 144 is slideably clamped to the top bar 14 and bottom bar 20 utilizing clamps 150 that are designed and function similarly to clamps 50 previously described. For additional strength, a horizontal mid-brace 152 is provided. Mid-brace 152 is welded at its lateral ends to side bars 116 and 118 at the mid-points thereof. The restraining bars 142 and 144 are slideably engaged with the mid-brace 152 utilizing clamps 154 that are similar in design to clamps 104, previously described. Mid-brace 152 thus provides added strength to the restraining bars 142 and 144 while allowing the restraining bars to retain their adjustable features. As with the other truck cargo racks described hereinabove, strap hook loops 76 are placed at a plurality of locations throughout the rack.

While the instant invention has been particularly shown and described with reference to certain preferred embodiments, it will be understood by those skilled in the art that various alterations and modifications in form and detail may be made therein. Acccordingly, it is intended that the following claims cover all such alterations and modifications as fall within the true spirit and scope of the invention.

What I claim is:

1. A truck cargo rack for holding cargo in the cargo holding portion of a truck, said cargo holding portion being defined by a horizontal surface termed a bed, and vertical side walls surrounding and rising from said bed to generally form a box-like structure with an open top, comprising:
   a frame, said frame including a horizontally disposed to member, two vertically disposed side members which are fixedly engaged to the ends of said top member and depend downwardly therefrom, and a horizontally disposed bottom member which is joined at its ends to said side members; said frame having a basically rectangular configuration and being sized to fit in the frontward portion of said cargo holding portion of said truck;
   a first attachment means for attachment of said frame to said bed of said cargo holding portion of said truck; said first attachment means being engaged to said bottom member and having a downwardly depending attachment portion for attachment thereof with said bed of said cargo holding portion of said truck;
   a second attachment means for attachment of said frame to said side walls of said cargo holding portion of said truck,;
   a restraining means for restraining the forward movement of cargo in said cargo holding portion of said truck, said restraining means being engaged to said frame;
   said frame and said restraining means each being formed with an engagement means for the engagement of a cargo securing means thereto; and
   a cargo securing means being releasably engaged to both said engagement means of said restraining means and said engagement means of said frame and disposed for holding said cargo against said restraining means to prevent movement of said cargo within said cargo holding portion of said truck.

2. The truck cargo rack as described in claim 1 wherein said restraining means includes two vertically disposed restraining bars, each said bar having an upper engagement means for joining said bar at its upper end to said top member and a lower engagement means for joining said bar at its lower end to said bottom member.

3. The truck cargo rack as described in claim 2 wherein said engagement means of at least one of said restraining bars with said top member and said bottom member includes a slideable clamp which permits said restraining bar to move laterally in slideable engagement with said top member and also said bottom member, and permits the clamping of said restraining bar to said top member and said bottom member at selectable locations.

4. A truck cargo rack as described in claim 2 wherein:
   said top member is formed with a U-shaped cross section including two to member leg segments and said bottom member is formed with a U-shaped cross section including two bottom member leg segments:
   said upper engagement means and said lower engagement means each including a clamp that is fixedly engaged to said restraining bar, each said clamp having a U-shaped cross section including two leg segments; the leg segments of said upper engagement means clamp being disposed to slideably engage a top member leg segment that will be interposed therebetween, and the leg segments of said lower engagement means clamp being disposed to .slideably engage a bottom member leg segment that will be interposed therebetween; each said clamp also including a bolt which is threadably engaged therein and disposed to apply clamping pressure on said interposed leg segment upon the tightening of said bolt within its threadable connection in said clamp.

5. The truck cargo rack as described in claim 2 wherein said restraining bars are formed to restrain said cargo against both frontal movement and lateral movement.

6. A truck cargo rack as described in claims 1, 2, 3 or 4 wherein said cargo securing means includes a flexible strap having two ends and being formed for engagement with said rack at each said end; said strap having a tightening means for effecting a secure engagement of said cargo within said rack.

7. A truck cargo rack as described in claim 4 wherein said frame includes a bracing member disposed to fixedly join the mid-section of said top member to the mid-section of said bottom member, thereby providing additional strength to said frame.

8. A truck cargo rack for holding cargo within the cargo holding portion of a truck, said cargo holding portion being defined by a horizontal surface termed a bed, and vertical side walls surrounding and rising from said bed to generally form a box-like structure with an open top, comprising:

a frame, said frame including a horizontally disposed top member, two vertically disposed side members which are fixedly engaged to the ends of said top member and depend downwardly therefrom, and a horizontally disposed bottom member which is joined at its ends to said side members; said frame having a basically rectangular configuration and being sized to fit in the frontward portion of said cargo holding portion of said truck;

a first attachment means for attaching said frame to said bed of said cargo holding portion of said truck, said first attachment means being engaged to said bottom member and having a downwardly depending attachment portion for attachment thereof with said bed at said cargo holding portion of said truck;

a second attachment means for attaching said frame to said side walls of said cargo holding portion of said truck;

a cargo support means being engaged within said frame and adapted for restraining the movement of said cargo, said cargo support means including a cargo restraining means and a frame engagement means for the engagement of said restraining means to said frame; and a cargo securing means being engaged to said frame and disposed for the secure holding of said cargo to said rack.

9. The truck cargo rack as described in claim 8 wherein said restraining means includes two vertically disposed restraining bars, and said frame engagement means includes two horizontally disposed frame engaging bars, each said restraining bar having a clamp means proximate its upper end to engage one of said frame engaging bars and another clamp means proximate its lower end to engage another of said frame engaging bars.

10. The truck cargo rack as described in claim 9 wherein said clamp means for the engagement of at least one of said restraining bars with said frame engaging bars includes a slideable clamp which permits said restraining bar to move laterally in slideable engagement with said frame engaging bars and permits the clamping of said restraining bar to said frame engaging bars at selectable locations.

11. A truck cargo rack as described in claim 9 wherein:

said frame engaging bars are formed with a circular cross section;

said clamp means including a clamp that is fixedly engaged to said restraining bar, said clamp being formed as a hollow cylinder and being disposed to slideably engage one of said frame engaging bars therein, said clamp also including a bolt which is threadably engaged therein and disposed to apply clamping pressure upon said frame engaging bar upon the tightening of said bolt within its threadable connection in said clamp.

12. The truck cargo rack as deribed in claim 9 wherein said restraining bars are formed to restrain said cargo against both frontal movement and lateral movement.

13. A truck cargo rack as described in claims 8, 9, 10 or 11 wherein said cargo securing means includes a flexible strap having two ends and being formed for engagement with said rack at each said end; said strap having a tightening means for effecting a secure engagement of said cargo within said rack.

14. A truck cargo rack as described in claim 11 wherein said frame includes a bracing member disposed to fixedly join the mid-section of said top member to the mid-section of said bottom member, thereby providing additional strength to said frame; said bracing member also being fixedly joined to the mid-section of each said frame engaging bars to provide additional strength thereto.

* * * * *